United States Statutory Invention Registration [19]

[11] Reg. Number: H801

Koechner et al. [43] Published: Jul. 3, 1990

[54] NUCLEAR FIBER SENSOR REMOTE DETECTION SYSTEM

[76] Inventors: Walter Koechner, Rte. 1, Box 83, Roundhill, Va. 22141; Deborah R. Van Wyck, 2743 Boomsbury Ct., Lake Ridge, Va. 22191; Gary P. Stevenson, 13339 Apgar Pl.; William Krug, 1014 Charles St., both of Herndon, Va. 22070; Tom McCollum, 46775 Melrose Ct., Apt. 303, Sterling, Va. 22170; Garry B. Spector, 5800 Quantrell Ave., Apt. 421, Alexandria, Va. 22312

[21] Appl. No.: 336,456

[22] Filed: Mar. 17, 1989

[51] Int. Cl.[5] ..... G01T 1/20

[52] U.S. Cl. ..... 250/368; 250/367; 250/369; 340/600

[58] Field of Search ..... 250/367, 368, 369, 366; 340/600, 522

[56] References Cited

U.S. PATENT DOCUMENTS 4,471,223 9/1984 Hurst et al. ..... 250/357.1
4,598,202 7/1986 Koechner ..... 250/366

FOREIGN PATENT DOCUMENTS 55-160875 12/1980 Japan ..... 250/367

*Primary Examiner*—Thomas H. Tarcza
*Assistant Examiner*—Linda J. Wallace

[57] ABSTRACT

A nuclear radiation detection system for remote monitoring of movement of nuclear material over a road or highway. Nuclear fiber sensors, which may be several meters long, are covertly positioned in at least two monitoring points, such as buried shallowly under the roadway or hung from a tunnel wall, along the path which a nuclear source may be clandestinely moved. These fiber sensors are individually connected, by an epoxy glue, to individual transmitting optical fibers. Movement of a nuclear radiation source in close proximity to the fiber sensors at the two or more monitoring points produces an optical signal which exceeds a preestablished threshold. These optical signals travel through the transmitting optical fibers, which may be about 1 kilometers long, to a electronic system comprised of a microprocessor controlled signal detecting, signal processing and even data storage means. The optical fibers and electronic system are also selectively hidden from view for security reasons. Any movement of a nuclear source is detected by strength and duration radiation signal data which is stored in the microprocessor memory. This data may be removed from the processor and read out by a data key means.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NUCLEAR FIBER SENSOR REMOTE DETECTION SYSTEM

The invention described herein may be manufactured, used, and licensed by the U.S. Government for governmental purposes without the payment of any royalties thereon.

BACKGROUND OF INVENTION

1. Field of the Invention

The present invention relates to a nuclear radiation detection system for monitoring movement of nuclear material across a perimeter defined by scintillator fiber sensor which forms a line detector over a length of many meters in the monitored area.

2. Prior Art

Previously, nuclear detectors have been comprised of gas-filled detectors used for gamma ray detection. Conventional nuclear detectors comprise Geiger-Mueller tubes, Sodium Iodide (NaI) scintillators, and Germanium drifted Lithium (Ge/Li) detectors, However, these type detectors are point sensors which measure radiation at low levels only in the immediate vicinity of the source and cannot readily be used in the remote and covert detection of nuclear sources moved across the perimeter of a monitored area. For the dectors to be covert, they would need to be installed on the side of a road at a suitable shielded or protected area. Therefore, the distance between a radiation source transported on the road and the detector becomes excessive. These detectors also have electronics directly associated therewith. This combination results in a relatively large device which cannot easily be hidden and is also susceptible to electromagnetic interference (EMI), dirt, vibrations, etc.

The Lithium drifted Germanium detectors must be continuously stored and operated at cryogenic temperatures in order to preserve the Lithium profile, a complexity that rules out the use of this detector for clandestine operation.

SUMMARY OF THE INVENTION

The present invention overcomes the above problems existing with the conventional nuclear detectors. The invention is comprised of nuclear radiation sensitive fiber sensors which form line detectors. These fiber sensors are selectively laid across a street or roadway, hung from the ceiling of tunnels or overpasses, mounted underneath bridges, etc. at two or more monitoring points precise distances apart. By placing the sensitive fiber in any of these manners the distance between a moving radiation source and the sensitive fiber is minimized and thus the input signal is maximized. Further, since the fiber sensors are line detectors which may be several meters in length the likelihood of being placed close to a moving nuclear source is greatly increased over the previous point sources. One of the coinventors in the present invention, Walter Koechner, has received a U.S. Pat. No. 4,598,202, entitled "Nuclear and Pressure Sensitive Line/Perimeter Detection System", which teaches use of similar scintillator fiber sensors in a detection system requiring simultaneous pressure and radiation source radiation impinging on the fiber sensors to generate a nuclear event.

The fiber sensors are each connected to an ultraviolet transmitting optical fiber, preferably by epoxying a sleeve over the connecting ends. The optical fibers, which may be up to or more than 1 kilometer long, are linked to a remotely located electronics system for transmitting the optical signals thereto. The electronics system has a microprocessor controlled optical signal detecting, signal processing, and event data dump storage and retrieval means. The signal detecting means is preferably a photomultiplier for each optical fiber. The signal processing and event data dump storage and retrieval means is controlled by a microprocessor. The event data may be recorded on a data key dump module in the microprocessor. The data key is simply removed from the microprocessor and at a convenient and protected place the data can be dumped. The play back may be on a personal computer in an office environment say once a month.

The present nuclear radiation detector system is an improvement over existing device, such as for example ionizing chambers, for the following reasons. The nuclear detector fiber sensor is not affected by electric or magnetic fields and transients, smoke, dirt, vibrations, etc because the electronics system is placed remotely from the sensors. Since the fiber sensor is a line detector, rather than a point sensor, nuclear radiation can be measured over a large area or across a perimeter. The fiber sensor, since it is very thin and flexible, can be routed around obstacles or placed unobtrusively in difficult to reach places. There may be a plurality of fiber sensors at each of the two or more monitoring points with all of the sensors sensitive to the same radiation source. Thus, there are great opportunities in locating the sensitive fibers in close proximity to the nuclear source when the source is being moved across the sensitive fibers.

The inner core material of the fiber sensors is sensitive to gamma or neutron flux photons which are isotopically generated into visible photons. The visible photons match the sensitivity of the cathode material of the photomuliplier tube, which is normally in the ultraviolet region. The inner core material may be comprised of polystyrene having an index of refraction of 1.59 and the polymer cladding outer material may be comprised of polymethylmethacrylate having an index of refraction of 1.49.

The fiber sensors may be routed around obstacles in a convenient pattern. As an example, the fiber sensors may be laid linearly under a roadway without any appreciable circular patterns. A plurality of fiber sensors may be epoxy glued together to form extensions of each other to a length of from say 10 to 100 meters overall. In some instances, extensions of a plurality of fiber sensors may take the shape of a circular pattern designed so that the nuclear radiation source will only cross at one monitoring point around the circumference of the pattern.

DETAILED DESCRIPTION OF THE PREFERRED EMBODIMENT

Figure 1:
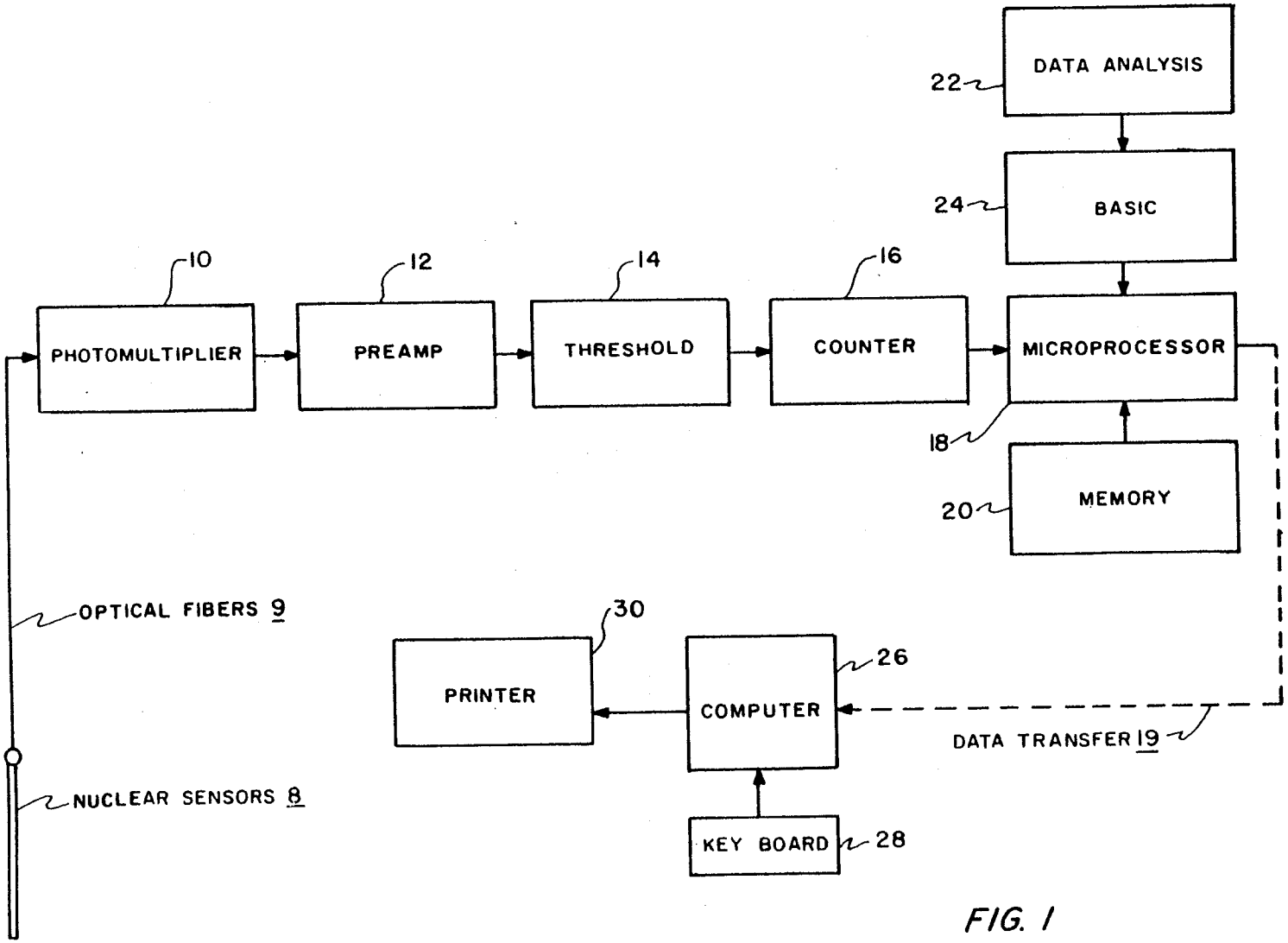
FIG. 1 is a block diagram schematic of the present nuclear fiber sensor remote detection system.

Refer to FIG. 1 where the block diagram schematic of the nuclear fiber sensor remote detection system is shown. At least two fiber sensor 8 sensitive to the same source must be used with one fiber sensor at each of two locations, or monitoring points, which are a precise distance apart along a path or roadway where a nuclear source is possibly going to be moved. The sensors record the time and the strength of the radiation source moving over each monitoring point. The time it takes to transport the source from one point to the other point is used to calculate the speed of the vehicle transporting the source. The source strength and transport speed are recorded in the system memory for later retrieval. The present system not only detects the nuclear source but calculates any quick unauthorized movement of the source. The monitoring points should be about 50 meters to 100 meters apart in an area where a transport vehicle should move no more than 30 kilometers per hour. Each fiber sensor 8 is connected to one transmitting optical fiber of the at least two optical fibers 9. The optical signals generated in 8 by movement of the radiation source in closed proximity thereto is transmitted through 9 to an electronics system. The fiber sensors are specifically doped to detect low, medium or high gamma rays or neutron flux photons which are isotopically generated into visible photons. By addition of high-Z materials, such as lead or tin, the photopeak efficiency increases significantly at low gamma energies.

Figure 2:
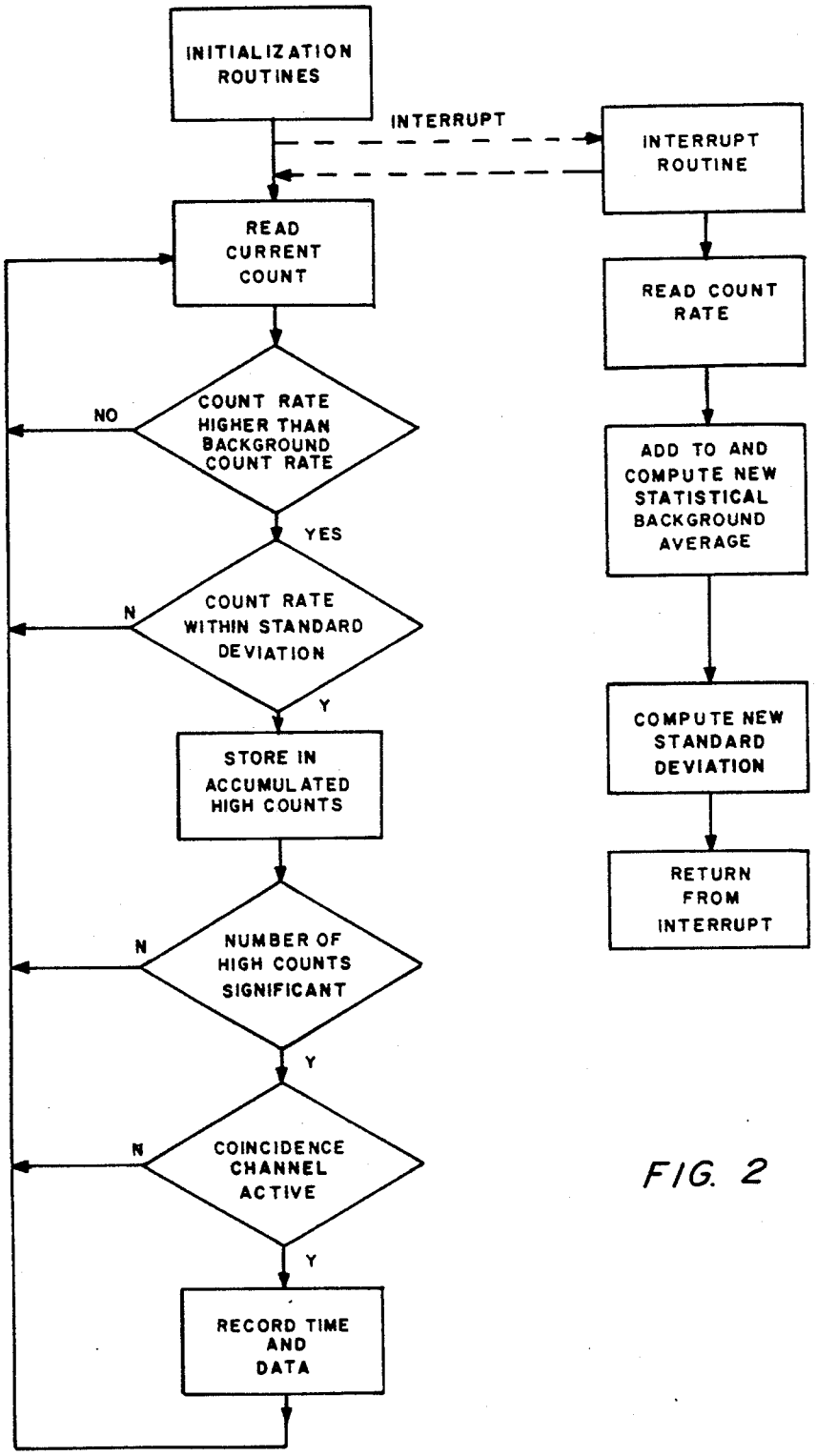
FIG. 2 illustrates a simplified flowchart of the event verification algorithm used in the system.

The electronics system is a sealed self contained battery operated device which can operate for months without being serviced. The electronic system is comprised of optical detector and amplifier means and microprocessor 18 based signal processing and data storage and retrieval means. The optical detector and amplifier means is preferably photomultiplies 10 as needed and their preamplifiers 12 for amplifying the output electrical pulses converted from the optical signal inputs from 9. The microprocessor based signal processing and data storage and retrieval means is comprised of a microprocessor 18, a threshold discriminator 14 which has therein the low threshold, or trigger level signals, and the high threshold, or nuclear event level signals, and a counter 61 which counts at a set rate the event signals over a period of time. The microprocessors main functions are those of data acquisition and verification of event data. The microprocessor 18 counts the thresholded signals and stores this information in its memory 20. A data analysis means 22 and basic software support and real time clock data 24 are built into the microprocessor 18. The data analysis means 22 has an event verification algorithm which discriminates between background noise and valid radiation events. A simplified flowchart of the event verification algorithms used in the fiber sensor detection system is shown in FIG. 2. This program continually monitors the background count rate and adjusts the event thresholds at 14 accordingly. The trigger threshold is set based on the average background level. Any count exceeding the trigger threshold starts temporary storage of the count rate data. The counts are stored until two consecutive counts below the trigger threshold occur. At this time, all of the temporary stored counts are summed and compared to the high, or event, threshold which is based on the duration of the possible event as well as the average background level. If the sum of the counts in temporary storage is greater than the high threshold, the date, time, and counts for the event are stored in random-access-memory (RAM).

The microprocessor 18 controls several functions in the remote detection system. The functions include continual interrogation of signal lines, timekeeping functions, incoming data analysis and interpolation, input/output capability to external data storage, and control of input signal lines. The microprocessor used may be from the Motorola 6800 family or the ITEL 8000 family. The input/output capability to external data dump storage is comprised of entering the data into memory 20 by means of a data key storage device. The key may simply be removed and the data transferred, indicated by dashed line 19, from the microprocessor and dumped to a remotely located read-out and display system such as a personal computer 26. The computer 26 may have a printer 30 connected thereto for making a hard copy of the data. A keyboard 28 may be used to enter any additional data on the screen of 26.

We claim:

1. A fiber sensor nuclear line detector system for monitoring movement of nuclear material about a remote perimeter, said system comprising:

at least two nuclear fiber sensors portioned at two monitoring points a precise distance apart and individually located in close proximity to where a nuclear source will travel in an area to be monitored, each of said fiber sensors comprised of an organic scintillator inner core material embedded in a nuclear radiation transmitting polymer cladding outer material of a smaller index of refraction than said inner core material and which is fabricated into a nuclear radiation sensitive fiber sensor;

at least two ultraviolet transmitting optical fibers, each of said sensitive fiber sensors connected to one of said at least two ultraviolet transmitting optical fibers for transmission of optical signals generated in said fiber sensors by movement of a nuclear radiation source emitting radiation which impinges on said organic scintillator core material when in close proximity thereto;

a self contained sealed battery operated electronic system comprised of an optical detector and amplifier means for detecting said optical signals at the input thereto from said transmitting optical fibers and converting said optical signals into output electrical signal pulses according to the intensity and durations of said optical signals wherein said electrical signal pulses are passed through a preamplifier and signal thresholding device into a counter, said electronic system further comprised of microprocessor which serves as a data acquisition and verification device and which controls signal processing and data storage and has an event verification algorithm which discriminates between background noise and valid nuclear radiation events as indicated when the sum of the thresholded counts recorded by said counter exceeds a threshold signal in the microprocessor memory and a data key means for storing and retrieving event data along with exact time of said events; and an event readout and data display system remote to said electronic system wherein said data key means is a data key insertable into said mircorprocessor for recording event data thereon and is removable from said microprocessor and dumped into said event read-out and data display system at another location.

2. A system as set forth in claim 1 wherein said organic scintillator inner core material is sensitive to gamma or neutron flux photons which are isotopically generated into visible photons to match the sensitivity of said optical detector.

3. A system as set forth in claim 2 wherein said optical detector is a photomultiplier tube.

4. A system as set forth in claim 3 wherein said organic scintillator inner core material is comprises of polystyrene having an index of refraction of 1.59 and polymer cladding outer material is comprised of polymethylmethacrylate having an index of refraction of 1.49.

5. A system as set forth in claim 1 wherein said at least two nuclear fiber sensors positioned at precise distances apart is comprised of a plurality of fiber sensors positioned at each of said two monitoring points wherein all fiber sensors are sensitive to the same type nuclear radiation source.

6. A system as set forth in claim 5 wherein each of said plurality of fiber sensors are 10 meters to 100 meters in length to form a line detector and may be extensions of each other to extend the overall length of said line detector.

7. A system as set forth in claim 6 wherein said plurality of fiber sensors are individually connected to a plurality of ultraviolet transmitting optical fibers of said at least two ultraviolet transmitting optical fibers.

8. A system as set forth in claim 7 wherein said plurality of ultraviolet transmitting optical fibers are about 1 kilometer in length.

* * * * *